(12) United States Patent
Wu et al.

(10) Patent No.: US 9,541,720 B1
(45) Date of Patent: Jan. 10, 2017

(54) OPTICAL ELEMENT WITH LIGHT-SPLITTING FUNCTION

(71) Applicant: FORWARD OPTICS CO., LTD., Taichung (TW)

(72) Inventors: Huai-An Wu, Taichung (TW); Wei Shen, Taichung (TW); Yuan-Lin Lee, Taichung (TW)

(73) Assignee: FORWARD OPTICS CO., LTD., Taichung (TW)

( * ) Notice: Subject to any disclaimer, the term of this patent is extended or adjusted under 35 U.S.C. 154(b) by 0 days.

(21) Appl. No.: 15/148,094

(22) Filed: May 6, 2016

(51) Int. Cl.
  G02B 6/42 (2006.01)
  G02B 6/28 (2006.01)
  G02B 17/08 (2006.01)
  G02B 6/32 (2006.01)

(52) U.S. Cl.
  CPC ........... *G02B 6/4286* (2013.01); *G02B 6/2817* (2013.01); *G02B 6/32* (2013.01); *G02B 6/4214* (2013.01); *G02B 17/086* (2013.01)

(58) Field of Classification Search
  None
  See application file for complete search history.

(56) References Cited

U.S. PATENT DOCUMENTS

| | | | |
|---|---|---|---|
| 6,636,540 B2* | 10/2003 | Uebbing | H01S 5/02292 372/36 |
| 6,888,988 B2 | 5/2005 | Vancoille et al. | |
| 8,283,678 B2 | 10/2012 | Morioka | |
| 8,457,457 B2 | 6/2013 | Morioka | |
| 8,503,838 B2 | 8/2013 | Chen | |
| 8,787,714 B2 | 7/2014 | Morioka | |
| 2010/0265974 A1* | 10/2010 | Wang | H01S 5/4025 372/29.011 |
| 2011/0097037 A1* | 4/2011 | Kuznia | G02B 6/4214 385/33 |
| 2011/0305415 A1* | 12/2011 | Kawai | G02B 6/4292 385/14 |
| 2014/0133802 A1* | 5/2014 | Morioka | G02B 6/4214 385/33 |

* cited by examiner

*Primary Examiner* — Mike Stahl
(74) *Attorney, Agent, or Firm* — Fish & Richardson P.C.

(57) ABSTRACT

An optical element with light-splitting function includes a lens component and a reflecting mirror. The lens component includes first, second and third planes disposed to surround and parallel to a reference axis. The first plane is formed with a first collimating unit and a second collimating unit that is spaced apart from the first collimating unit. The second plane is formed with a third collimating unit. The third plane is formed with a groove extending along and indented toward the reference axis. The groove is defined by a fourth plane and a fifth plane. The fourth plane extends obliquely relative to the first plane. The reflecting mirror is disposed on the third plane to cover the groove and has a reflecting plane facing the fourth and fifth planes.

8 Claims, 2 Drawing Sheets

OPTICAL ELEMENT WITH LIGHT-SPLITTING FUNCTION

FIELD

The disclosure relates to an optical element, more particularly to an optical fiber coupler.

BACKGROUND

With the development of network communication, the urge to provide more data transmission services stimulates an ever-growing demand for increase of network communication bandwidth. Replacing conventional metal wires with optical fibers in wire communication modules for network communication among servers can not only increase the network communication bandwidth, but also lower energy consumption attributed to data transmission. Moreover, the volume of the wire communication modules can also be reduced. Recently, to further reduce the volume of the wire communication modules, multi-channel optical fiber couplers are adopted accordingly to substitute single-channel optical couplers.

In U.S. Pat. No. 6,888,988, No. 8283678, and No. 8457457, conventional one-piece optical couplers are disclosed for directing a light beam from a light source into an optical fiber. Such conventional optical couplers may be able to, by virtue of the configuration/structure thereof, split the light beam into multiple parts including, e.g., a first part to propagate along a first optical path to be received by the optical fiber, and a second part to propagate along a second optical path to be received by a photo detector for detecting and monitoring the light power thereof. Since a power ratio among the parts of the light beam usually remains constant, the light power of the first part can be calculated from that of the second part detected by the photo detector, thereby allowing power adjustment of the light source to provide a relatively stable power input for the optical fiber. However, such one-piece conventional optical fiber couplers require delicate manufacturing processes and thus have relatively high production costs and relatively low product yields.

U.S. Pat. No. 8,503,838 discloses a two-piece conventional optical fiber coupler, where a component of such conventional optical fiber coupler may be provided with an optical coating for lowering the output power of the light beam to be received by the optical fiber. Although it is relatively simple to manufacture each component of the conventional optical fiber coupler in comparison with the aforesaid one-piece optical fiber couplers, both components still have three-dimensional structures, such as grooves or convex surfaces which are relatively difficult to form, and the assembling tolerance becomes an important factor that affects the reliability of the same.

In U.S. Pat. No. 8,787,714, there is disclosed a three-piece conventional optical fiber coupler which further includes a main body, a prism, and a light filter which can be replaced for adjusting the output light power. However, adhesives are required for connecting the prism to the main body, and air bubbles in the adhesive may adversely affect the optical property of such conventional optical fiber coupler.

SUMMARY

Therefore, an object of the disclosure is to provide an optical element that can alleviate at least one of the drawbacks of the prior art.

According to one aspect of the disclosure, an optical element with light-splitting function includes a lens component and a reflecting mirror.

The lens component includes first, second and third planes disposed to surround and parallel to a reference axis. The first plane is formed with a first collimating unit, and a second collimating unit that is spaced apart from the first collimating unit. The second plane is formed with a third collimating unit. The third plane is formed with a groove extending along and indented toward the reference axis. The groove is defined by a fourth plane and a fifth plane. The fourth plane extends obliquely relative to the first plane.

The reflecting mirror is disposed on the third plane to cover the groove and has a reflecting plane facing the fourth and fifth planes.

When a light beam incident from the first collimating unit propagates within the lens component along a first optical path to reach the fourth plane, one part of the light beam is reflected by the fourth plane toward the second collimating unit and propagates along a monitoring optical path to exit the lens component, and the other part of the light beam enters, by refraction through the fourth plane, and propagates within the groove to be reflected by the reflecting plane of the reflecting mirror, followed by entering, by refraction through the fifth plane, and propagating within the lens component along a second optical path toward the third collimating unit to exit the lens component.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
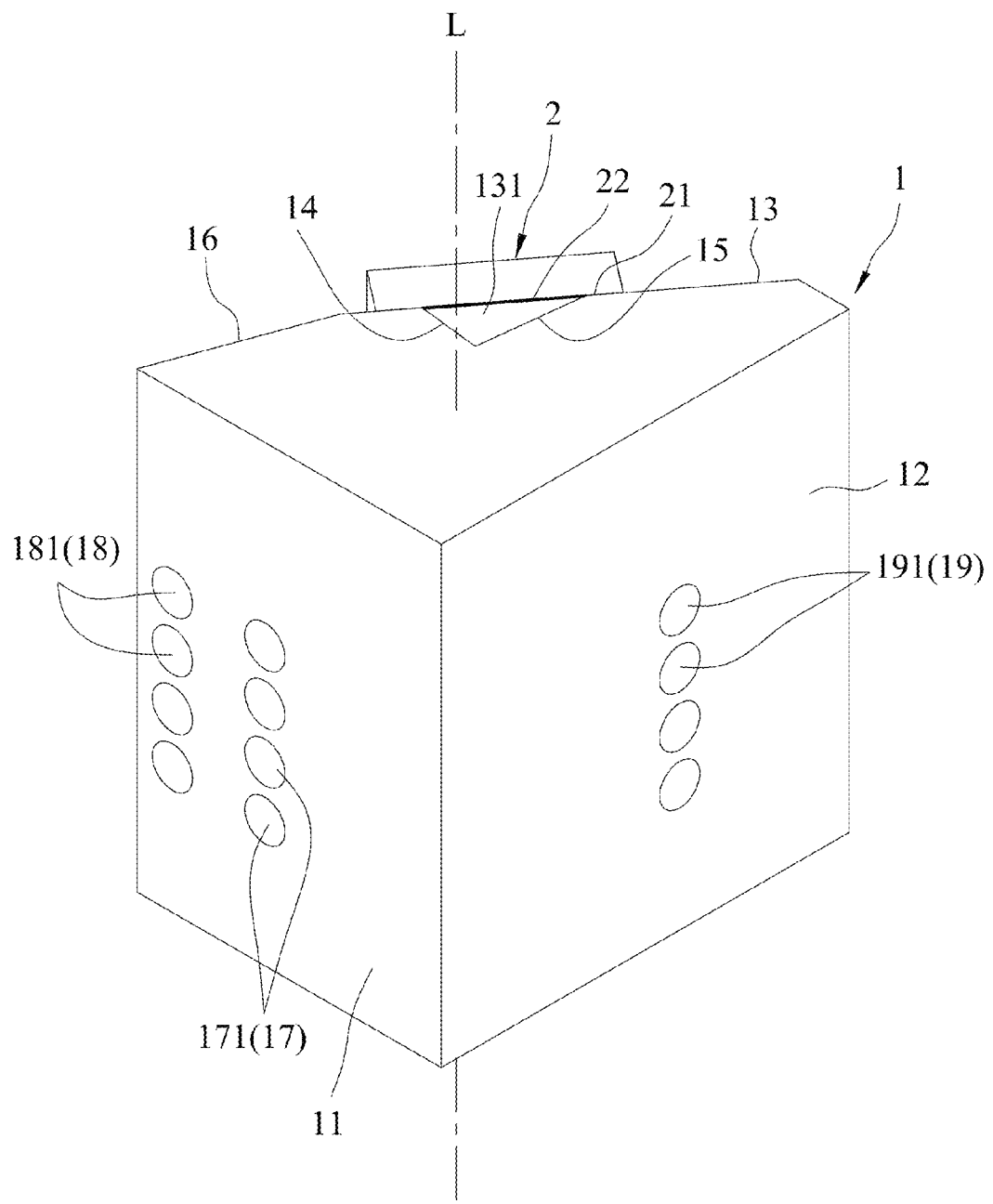
FIG. 1 is a perspective view illustrating an exemplary embodiment of an optical element according to the disclosure.
Figure 2:
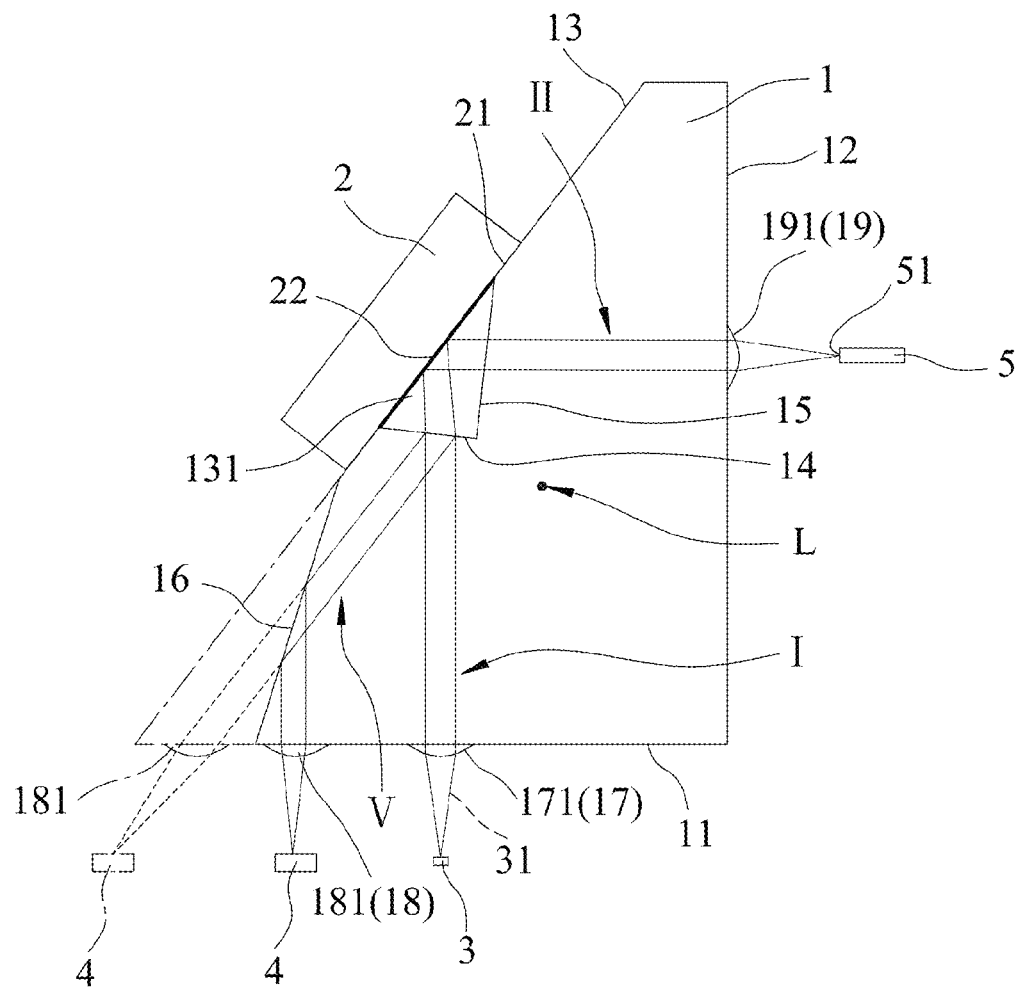
FIG. 2 is a side schematic view of the exemplary embodiment.

Referring to FIGS. 1 and 2, one exemplary embodiment of an optical element with light-splitting function is shown to include a lens component 1 and a reflecting mirror 2.

As illustrated in FIG. 1, the lens component 1 extends along a reference axis (L) and has a first plane 11, a second plane 12, and a third plane 13 which are disposed to surround the reference axis (L) and are parallel to the reference axis (L). In this embodiment, the lens component 1 is made of plastic, but can be made of glass in other embodiments according to the present disclosure. As illustrated in FIG. 1, the lens component 1 may further have a sixth plane 16 extending parallel to the reference axis (L) and interconnecting the first and third planes 11, 13. In this embodiment, an angle between the first plane 11 and the third plane 13 is about 45°, but is not limited thereto in other embodiments. The third plane 13 is formed with a groove 131 that extends along and is indented toward the reference axis (L) and that is defined by a fourth plane 14 and a fifth plane 15 which are parallel to the reference axis (L). The fourth plane 14 extends obliquely relative to the first plane 11, i.e., the first plane 11 and the fourth plane 14 are not parallel. In this embodiment, the first plane 11 is formed with a first collimating unit 17 and a second collimating unit 18 that is spaced apart from the first collimating unit 17, and the second plane 12 is formed with a third collimating unit 19.

In greater detail, the first collimating unit 17 of this embodiment includes a plurality of spaced-apart first collimating lenses 171 arranged along the reference axis (L), the second collimating unit 18 includes a plurality of spaced-apart second collimating lenses 181 arranged along the reference axis (L), and the third collimating unit 19 includes a plurality of spaced-apart third collimating lenses 191 arranged along the reference axis (L).

The reflecting mirror 2 is disposed on the third plane 13 of the lens component 1 to cover the groove 131, and has a reflecting plane 21 facing the fourth and fifth planes 14, 15 of the lens component 1. In this embodiment, the reflecting mirror 2 may further have a reflective coating 22 formed on the reflecting plane 21. The reflecting mirror 2 may be made of one of glass, metal and plastic. In this embodiment, the reflecting mirror 2 is made of glass and is planar.

When using the optical element of the present disclosure as a multi-channel optical fiber coupler, a plurality of light sources 3, e.g. lasers, may be disposed corresponding respectively to the first collimating lenses 171, a plurality of photo detectors 4 may be disposed corresponding respectively to the second collimating lenses 181, and receiving ends 51 of a plurality of optical fibers 5 may be disposed corresponding respectively to the third collimating lenses 191. When a light beam 31 from each of the light sources 3 enters the lens component 1 via a respective one of the first collimating lenses 171 and propagates within the lens component 1 along a first optical path (I) to reach the fourth plane 14, one part of the light beam 31 from each of the light sources 3 is reflected by the fourth plane 14 toward a respective one of the second collimating lenses 181 along a monitoring optical path (V) so as to exit the lens component 1 and to be detected by a respective one of the photo detectors 4. In the meantime, the other part of the light beam 31 from each of the light sources 3 enters the groove 131 by refraction through the fourth plane 14 and propagates within the groove 131 to be reflected by the reflecting plane 21 of the reflecting mirror 2, followed by entering the lens component 1 again, by refraction through the fifth plane 15, and propagating along a second optical path (II) toward a respective one of the third collimating lenses 191, so as to exit the lens component 1 and to be received by the receiving end 51 of a respective one of the optical fibers 5.

It is worth noting that, an angle between the first plane 11 and the fourth plane 14 may range from 5° to 35°. It is also worth noting that an angle between the fourth plane 14 and the fifth plane 15 may be adjusted in accordance with the angle between the first plane 11 and the fourth plane 14. In this embodiment, the second optical path (II) is perpendicular to the second plane 12, but is not limited thereto according to the present disclosure. Also, the first plane 11 may be perpendicular to the second plane 12.

It is also worth noting that, in this embodiment, the part of the light beam 31 from each of the light sources 3, after being reflected by the fourth plane 14, may be totally-reflected by the sixth plane 16 and toward the respective one of the second collimating lenses 181 so as to exit the lens component 1. Such configuration of the lens component 1 can not only further reduce the overall volume of the optical element, but is also suitable for the photo detectors 4 with smaller sizes. It may be noted that, in other embodiments, the sixth plane 16 may be omitted from the lens component 1, i.e., having the first plane 11 and third plane 13 extending to be interconnected as illustrated in FIG. 2 (the dotted lines).

The two-piece configuration of the optical element according to the present disclosure is capable of splitting the light beam 31 so as to have the part of the light beam 31 propagating along the monitoring optical path (V) to be detected by the respective one of the photo detectors 4 for monitoring the input power of the light beam 31. In addition, in the embodiments where the reflecting mirror 2 is planar and is made of glass, surface coating on the reflecting mirror 2 is relatively simple and cost-effective as opposed to having the same coating on plastic lens elements as disclosed by the prior art. By adjusting the reflectance of the reflecting mirror 2, e.g., having different reflective coatings 22, the input power of the other part of the light beam 31 received by the receiving ends 51 of the respective one of the optical fibers 5 can be effectively lowered. Also, since no adhesive is required in either one of the first optical path (I), the monitoring optical path (V) and the second optical path (II), the aforementioned problem with respect to the air bubbles in the adhesive can be prevented.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. An optical element with light-splitting function, comprising:
    a lens component including first, second and third planes disposed to surround and parallel to a reference axis, said first plane being formed with a first collimating unit and a second collimating unit that is spaced apart from said first collimating unit, said second plane being formed with a third collimating unit, said third plane being formed with a groove extending along and indented toward said reference axis, said groove being defined by a fourth plane and a fifth plane, said fourth plane extending obliquely relative to said first plane; and
    a reflecting mirror disposed on said third plane to cover said groove and having a reflecting plane facing said fourth and fifth planes,
    wherein, when a light beam incident from said first collimating unit propagates within said lens component along a first optical path to reach said fourth plane, one part of the light beam is reflected by said fourth plane toward said second collimating unit and propagates along a monitoring optical path to exit said lens component, and the other part of the light beam enters, by refraction through said fourth plane, and propagates within said groove to be reflected by said reflecting plane of said reflecting mirror, followed by entering, by refraction through said fifth plane, and propagating within said lens component along a second optical path toward said third collimating unit to exit said lens component.

2. The optical element according to claim 1, wherein said first collimating unit includes a plurality of spaced-apart first collimating lenses arranged along said reference axis, said second collimating unit includes a plurality of spaced-apart second collimating lenses arranged along said reference axis, and said third collimating unit includes a plurality of spaced-apart third collimating lenses arranged along said reference axis.

3. The optical element according to claim 1, wherein said lens component is made of one of glass and plastic.

4. The optical element according to claim 1, wherein said reflecting mirror is made of one of glass, metal and plastic.

5. The optical element according to claim 1, wherein said first plane is perpendicular to said second plane.

6. The optical element according to claim 1, wherein an angle between said first plane and said fourth plane ranges from 5° to 35°.

7. The optical element according to claim 1, wherein said lens component further includes a sixth plane extending along said reference axis and interconnecting said first and third planes, the part of the light beam, after being reflected by said fourth plane, being totally-reflected by said sixth plane and toward said second collimating unit so as to exit said lens component.

8. The optical element according to claim 1, wherein said reflecting mirror has a reflective coating formed on said reflecting plane.

* * * * *